Dec. 12, 1950     J. VERNER     2,533,643
ARTIFICIAL TEAT
Filed May 3, 1946
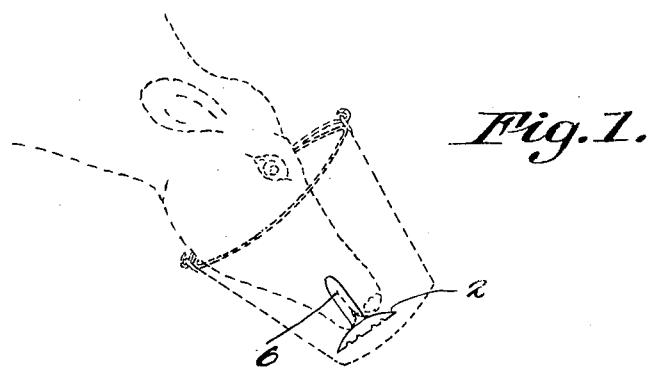
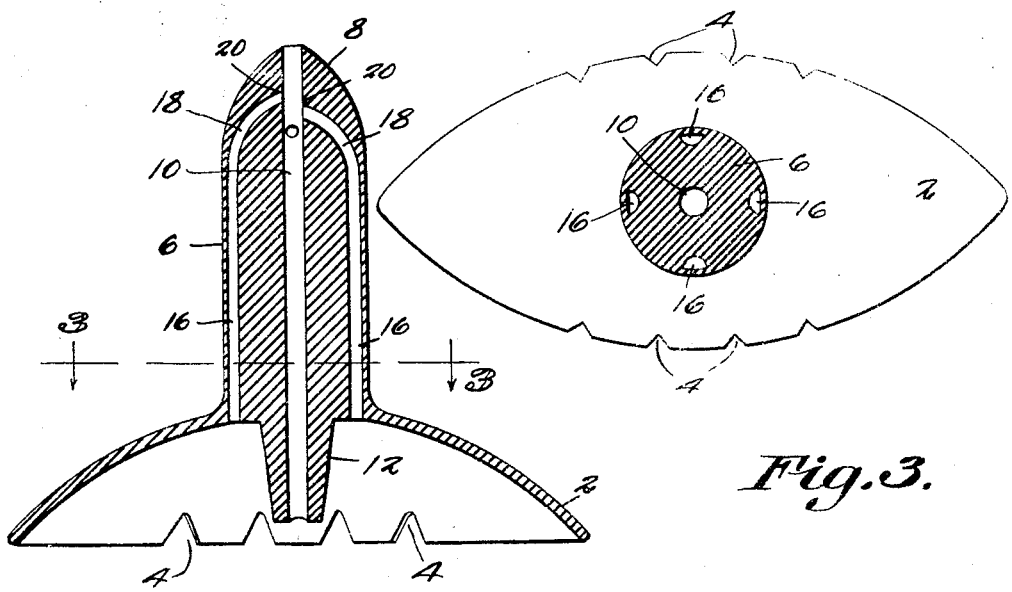
James Verner
INVENTOR.
BY *CA Knowles*
ATTORNEYS.

Patented Dec. 12, 1950

2,533,643

UNITED STATES PATENT OFFICE 2,533,643

ARTIFICIAL TEAT

James Verner, Pocahontas, Iowa

Application May 3, 1946, Serial No. 667,098

2 Claims. (Cl. 119—71)

My present invention relates to an improved artificial teat with particular reference to the type of suckling appliance adaptable for use in feeding calves.

The device of my invention comprises generally an artificial teat of soft sponge rubber having a base and fluid passageways therethrough in order that the calf may be offered the soft teat whereupon it will suck on the teat and when the base is placed in milk in a pail, the calf will easily be taught to drink from the pail.

In the accompanying drawings I have illustrated one complete example of the physical embodiment of my invention according to the best mode I have thus far devised but it will be understood that various changes and alterations may be made in the exemplified structure within the scope of the appended claims.

In the drawings:

Figure 1 is a view of a calf suckling milk from a pail by means of the artificial teat of my invention.

Figure 2 is a vertical sectional view of the teat.

Figure 3 is a horizontal sectional view thereof taken at line 3—3 of Figure 2.

Referring now to the drawings in detail, I have illustrated the artificial teat of my invention embodying a base 2 generally concavo-convex in cross section formed of a soft flexible material as sponge rubber and formed with peripheral notches 4.

A solid extension 6 is integral with the base and is formed of the same material and tapers inwardly as at 8 toward the vertical axis thereof and merges with the upper opening of the central passageway 10. This passage 10 extends downwardly through the lower collar 12 on the extension within the confines of the base 2, and notches 4 are formed in this collar. The central passageway is open at both ends, having an inlet opening in the collar 12 and an outlet opening in the center of the tapered upper end 8 of said extension.

Additional passages 16 are diametrically opposed and spaced around the central passage 10 and these passages 16 terminte at their lower ends in the base above the collar 12. The passages 16 are respectively provided with inlet openings spaced from each other and from the inlet opening of the central passageway.

The passages 16 curve inwardly at 18 and join the central passage 10 as at 20. The outlet openings 20 of said passages 16 are staggered longitudinally of the extension (see Fig. 2). Having the passages 16 open into the central passage 10 intermediate the ends of said central passage results in a teat having a plurality of separate and individual inlet openings and associated inlet passages, but only one outlet opening and outlet passage. This construction, formed in a solid extension 6, has the advantage that if pressure tending to compress the teat is exerted at any diametrically opposed points of the teat, which is the pressure which would result when the teat is bitten, there will always be a pair of passages left open. In other words, when the calf bites, it is possible that he might close diametrically opposed passages 16 and also the central passage 10. This will still leave the other pair of passages 16 open.

In use I have found it advantageous to first offer the artificial teat of my invention to the calf whereupon the pail of milk is then proffered and the calf having the teat in its mouth will dip its head into the pail sucking through the passages of the teat. As the base is inserted or submerged in the milk the sucking will be successful and the calf will receive milk. As the level of the milk in the pail lowers, the farmer will tip the pail so that the last drop of milk may be obtained by the calf through the passageway terminating in the lower collar. The base will flex and the collar may be pushed into the angle between the pail bottom and its wall.

The artificial teat of my invention will successfully simulate the teat of a cow in both feel and result and thus the calf will have no objection to suckling milk therethrough.

Having thus fully described my invention what I claim as new and desire to secure by Letters Patent is:

1. An artificial teat of soft flexible material including a base, and a solid extension upstanding therefrom, said extension having a central main passage extending from end to end thereof and having an inlet opening in the base and an outlet opening at the upper end of the extension, there being circumferentially spaced outer passages extending substantially from end to end of said extension, said outer passages respectively having inlet openings communicating with the base and spaced from each other and from the first-named inlet opening, said outer passages having spaced outlet openings opening into the main passage intermediate the ends of said main passage.

2. An artificial teat of soft flexible material including a base, a solid extension upstanding therefrom, said extension having a central main passage extending from end to end thereof and having an inlet opening in the base and an outlet opening at the upper end of the extension, there being circumferentially spaced outer passages extending substantially from end to end of said extension, said outer passages respectively having spaced inlet openings communicating with the base and spaced from each other and from the first-named inlet opening, said outer passages having spaced outlet openings opening into the main passage intermediate the ends of said main passage to define in said extension a plurality of spaced-apart inlet passages having individual inlet openings and merging into a single outlet passage formed with a single outlet opening for said extension, the outlet openings being staggered longitudinally of the main passage.

JAMES VERNER.

REFERENCES CITED

The following references are of record in the file of this patent:

UNITED STATES PATENTS

| Number | Name | Date |
|---|---|---|
| 400,962 | Spencer | Apr. 9, 1889 |
| 1,656,157 | Correnti | Jan. 17, 1928 |
| 2,119,691 | Vanderbilt | June 7, 1935 |

FOREIGN PATENTS

| Number | Country | Date |
|---|---|---|
| 13,560 | Great Britain | June 1, 1905 |